United States Patent [19]

Domis et al.

[11] 4,139,069
[45] Feb. 13, 1979

[54] DIGITAL WEIGHING METHOD

[75] Inventors: Emiel De Senerpont Domis; Robert M. Cadwell, both of San Jose, Calif.

[73] Assignee: Acurex Corporation, Mountain View, Calif.

[21] Appl. No.: 809,273

[22] Filed: Jun. 23, 1977

[51] Int. Cl.² .................... G01G 19/52; G01G 3/14; B07B 13/08
[52] U.S. Cl. .......................................... 177/1; 177/50; 177/210 FP
[58] Field of Search ........ 177/1, 50, 210 FP, DIG. 3, 177/164, 165; 364/567, 568; 209/121

[56] References Cited
U.S. PATENT DOCUMENTS

| | | | |
|---|---|---|---|
| 3,545,611 | 12/1970 | Husome | 177/210 FP X |
| 3,681,570 | 8/1972 | Abt | 177/50 UX |
| 3,807,516 | 4/1974 | Whitney | 177/210 FP X |
| 4,063,604 | 12/1977 | Rock | 177/210 FP X |

Primary Examiner—George H. Miller, Jr.
Attorney, Agent, or Firm—Flehr, Hohbach, Test, Albritton & Herbert

[57] ABSTRACT

A checkweigher uses a strain gauge load cell to provide a digital count which in turn is utilized to provide for automatic rezeroing and simplified referencing. The "grey zone" is taken into account for 100% rejection. Give away weight and standard deviation are also automatically determined.

26 Claims, 13 Drawing Figures

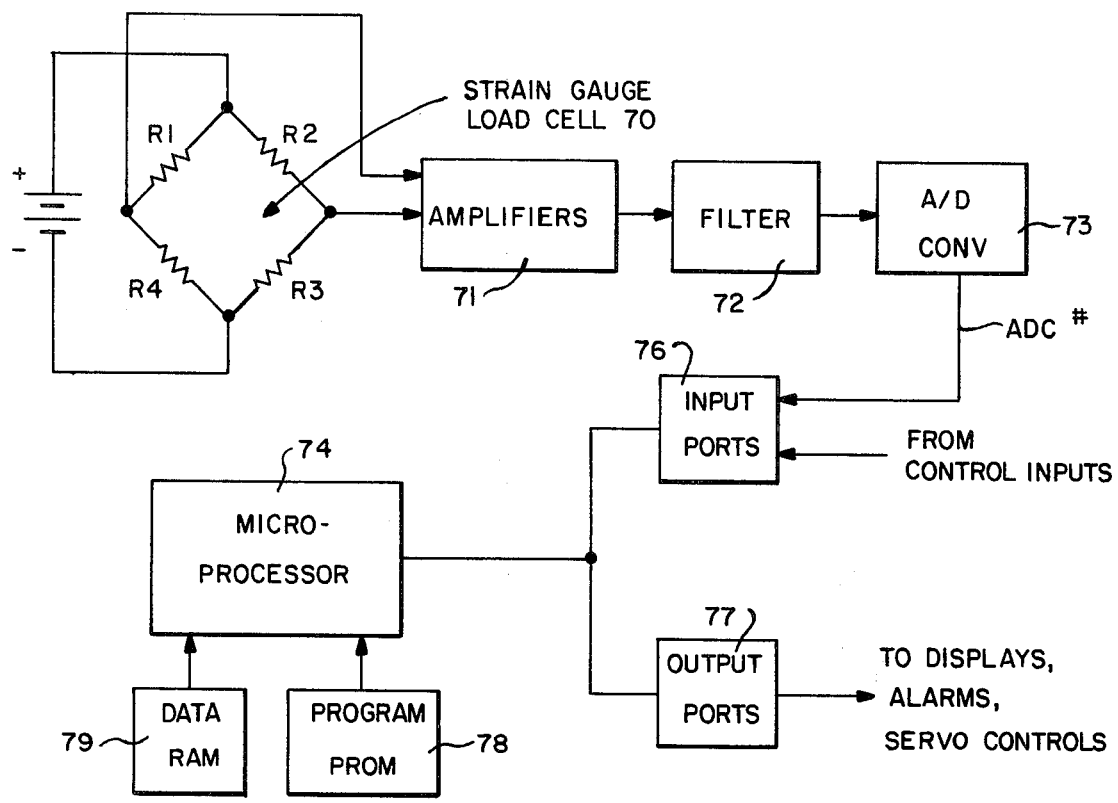
FIG.—1
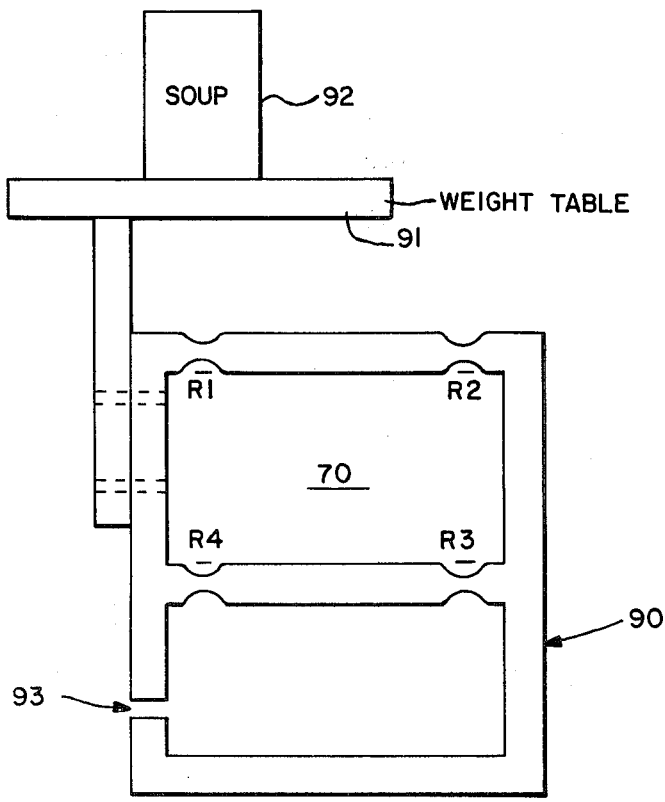
FIG.—2

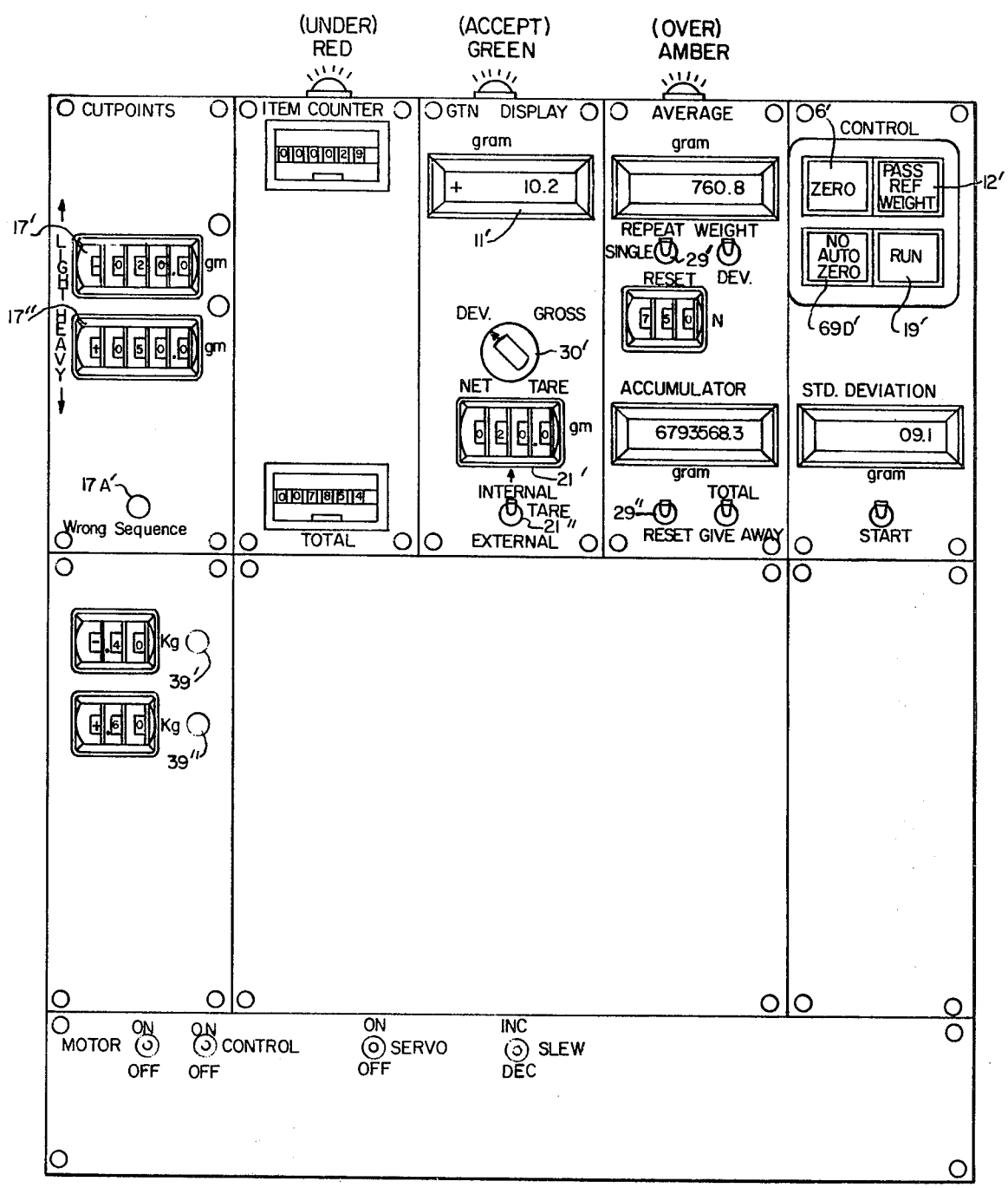
FIG.—3

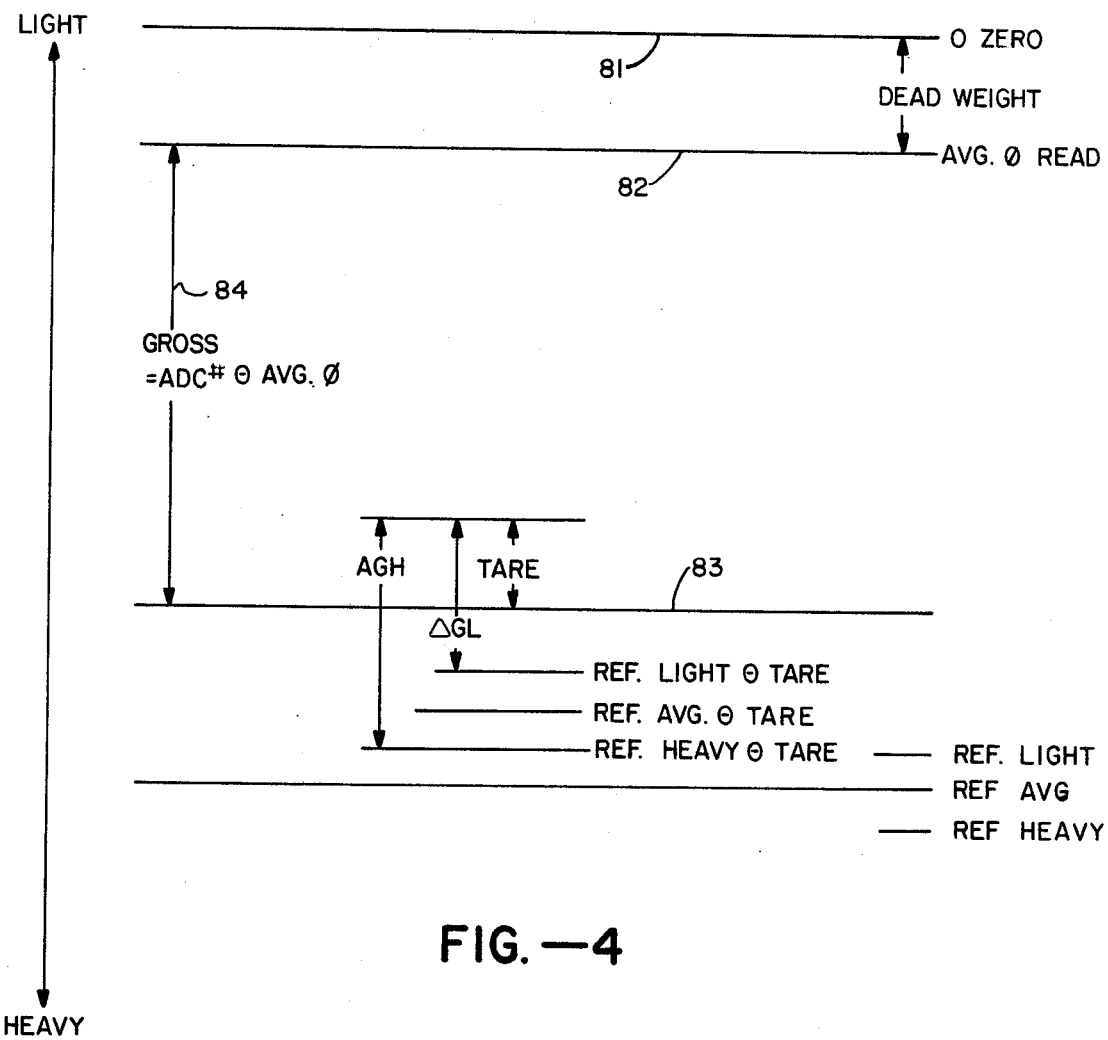
FIG.—4
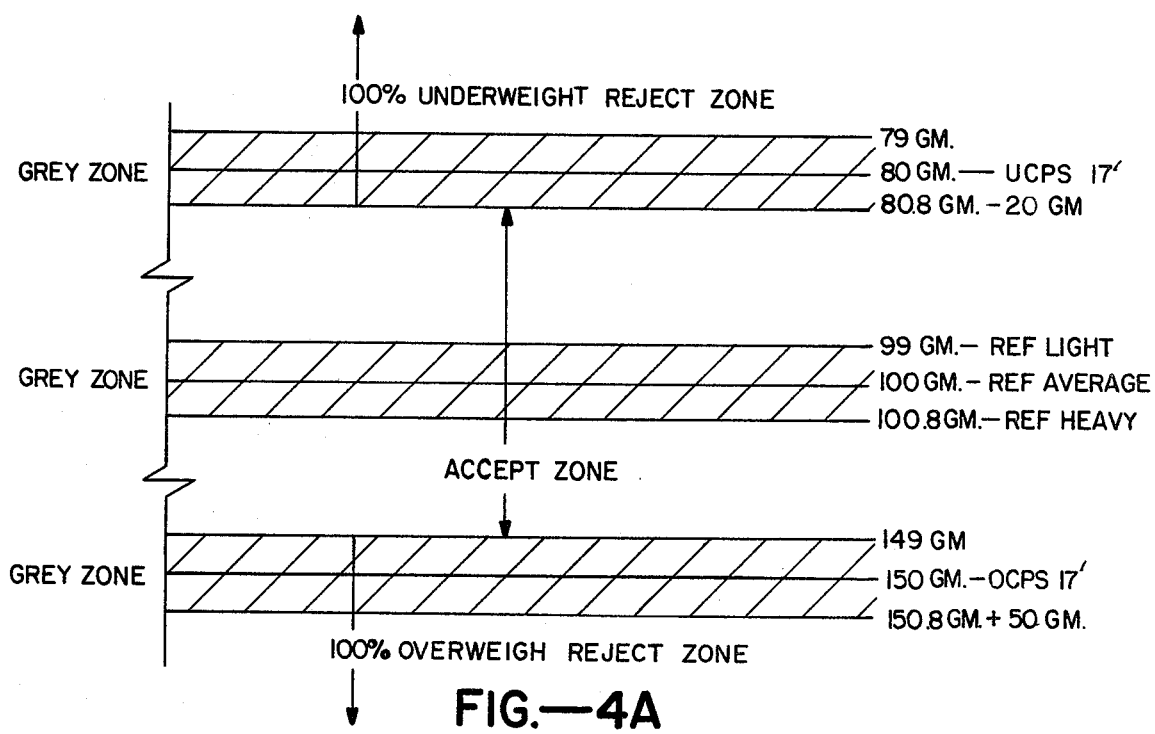
FIG.—4A

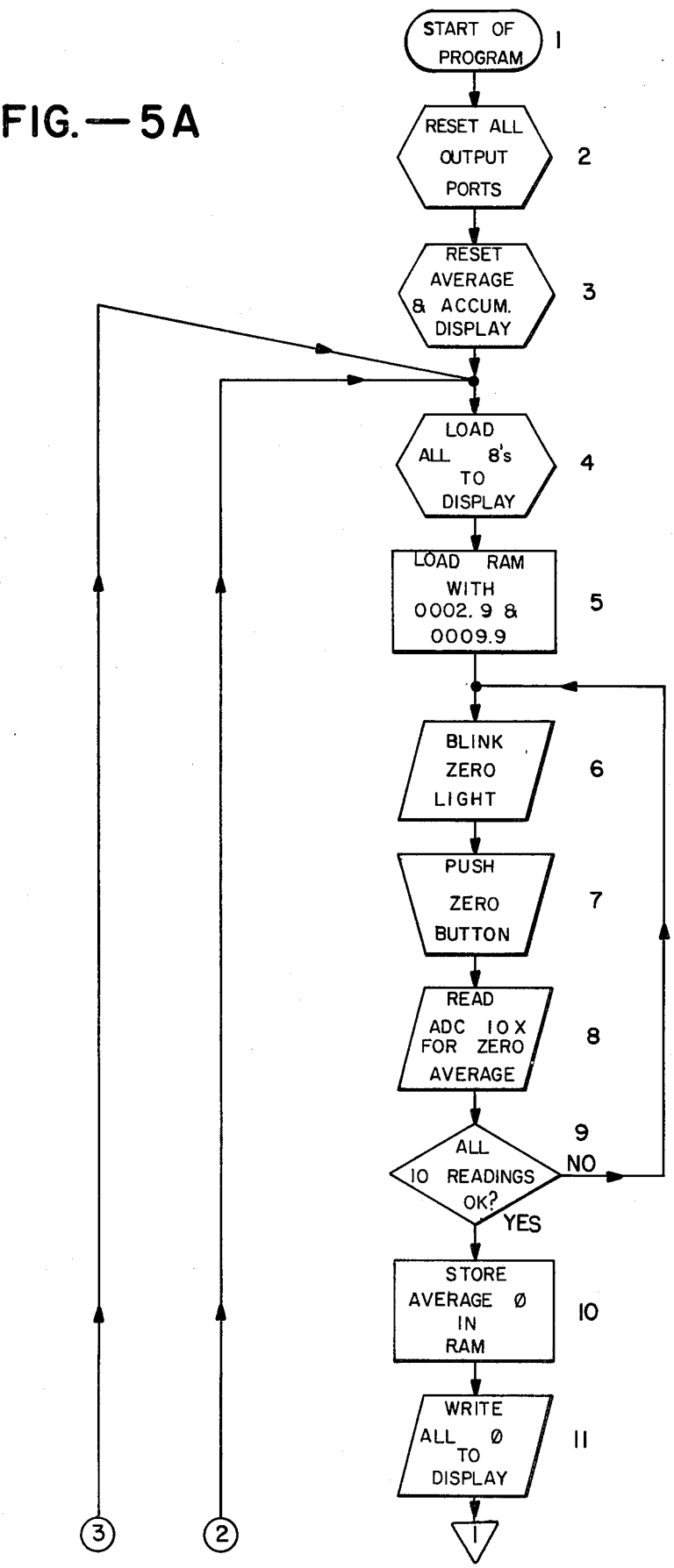
FIG.—5A

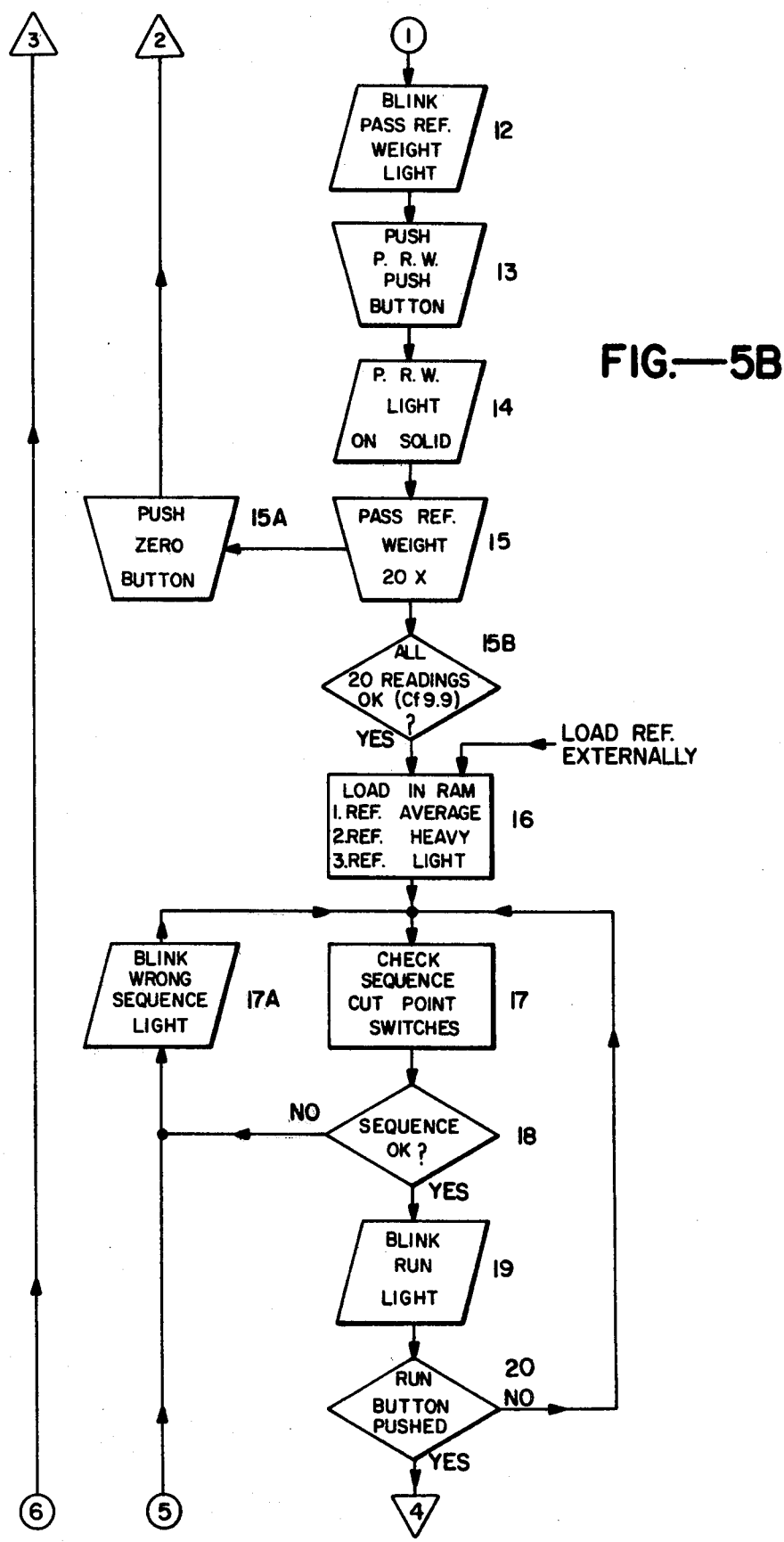
FIG.—5B

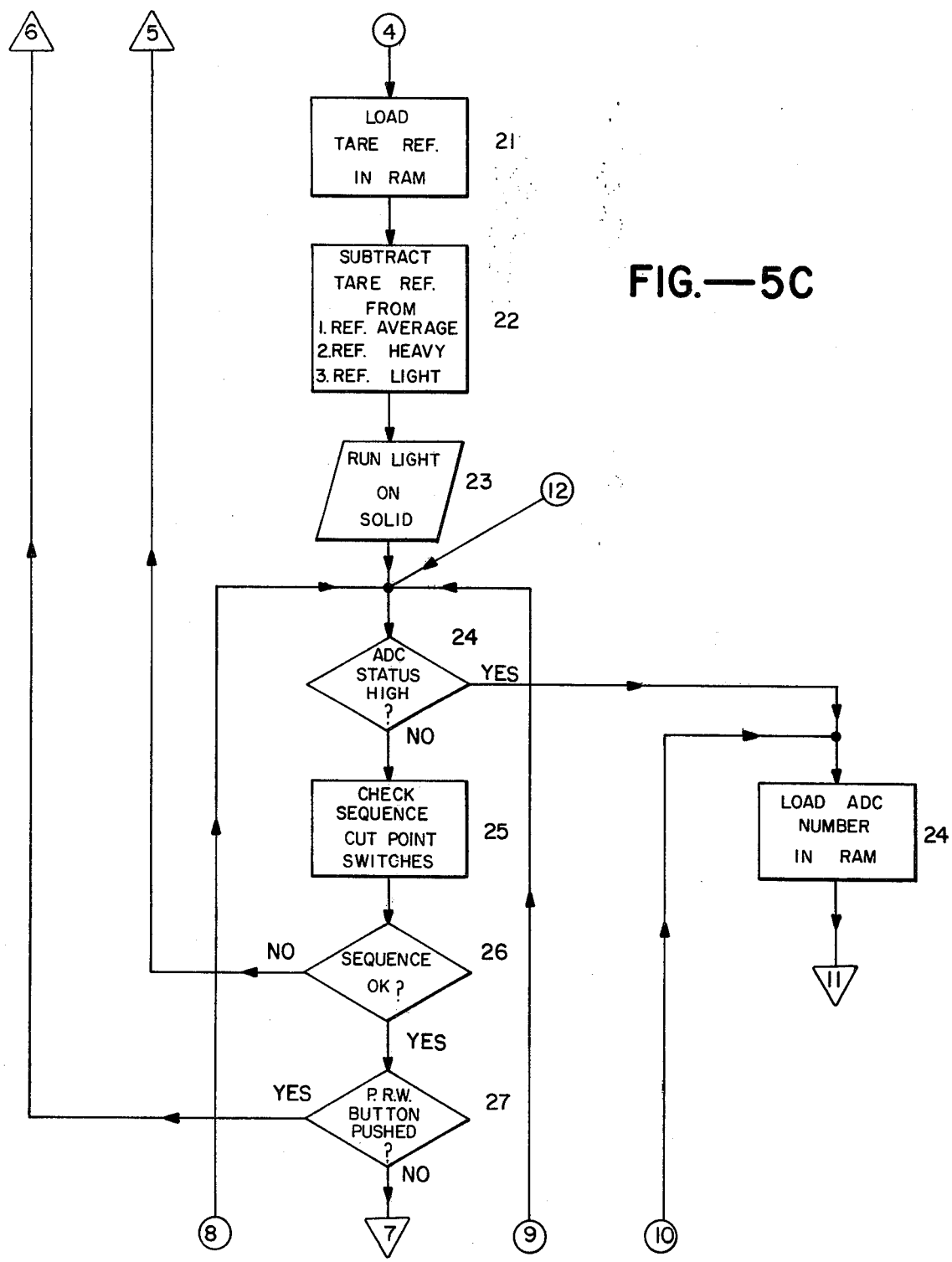
FIG.—5C

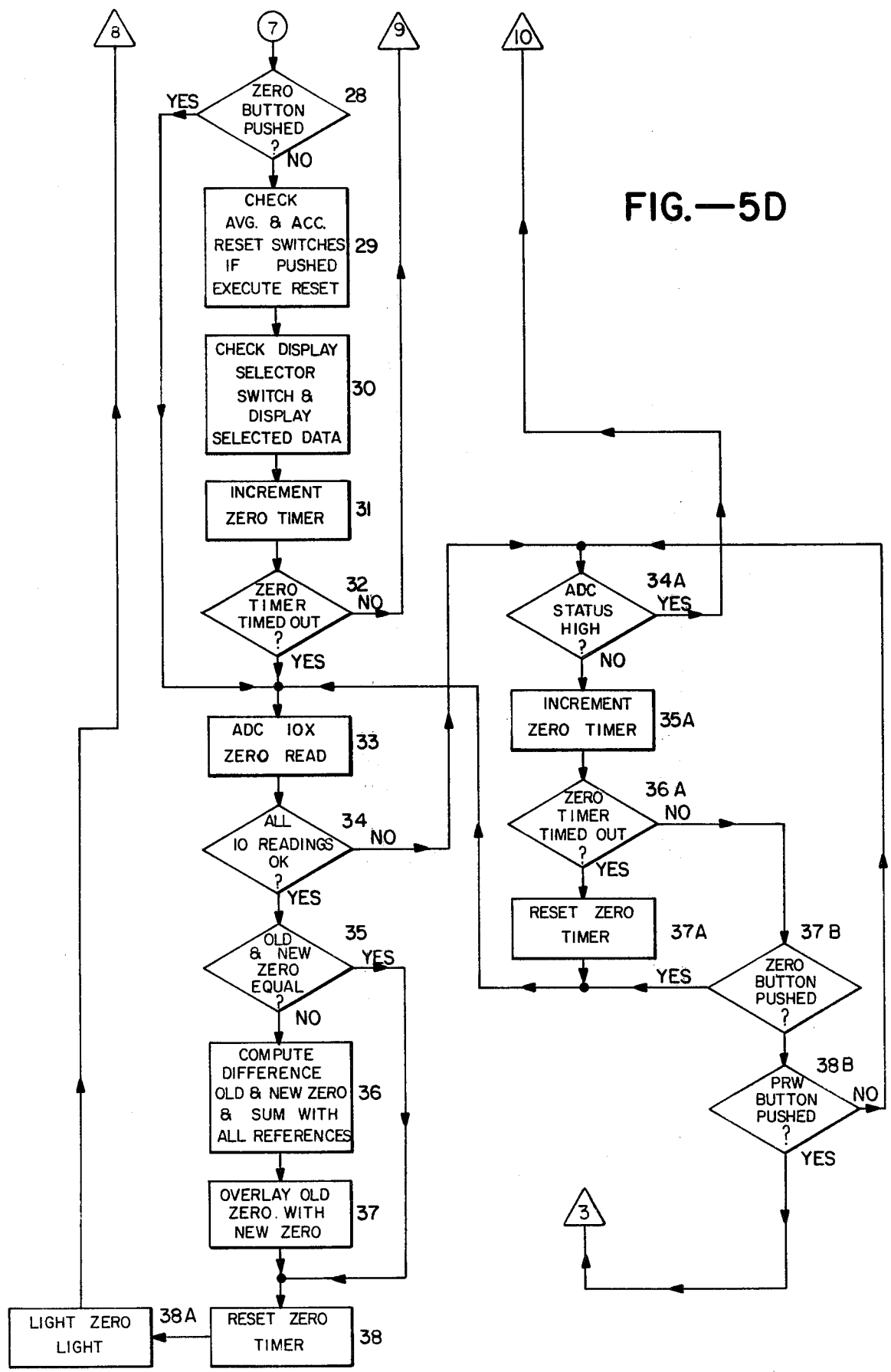
FIG.—5D

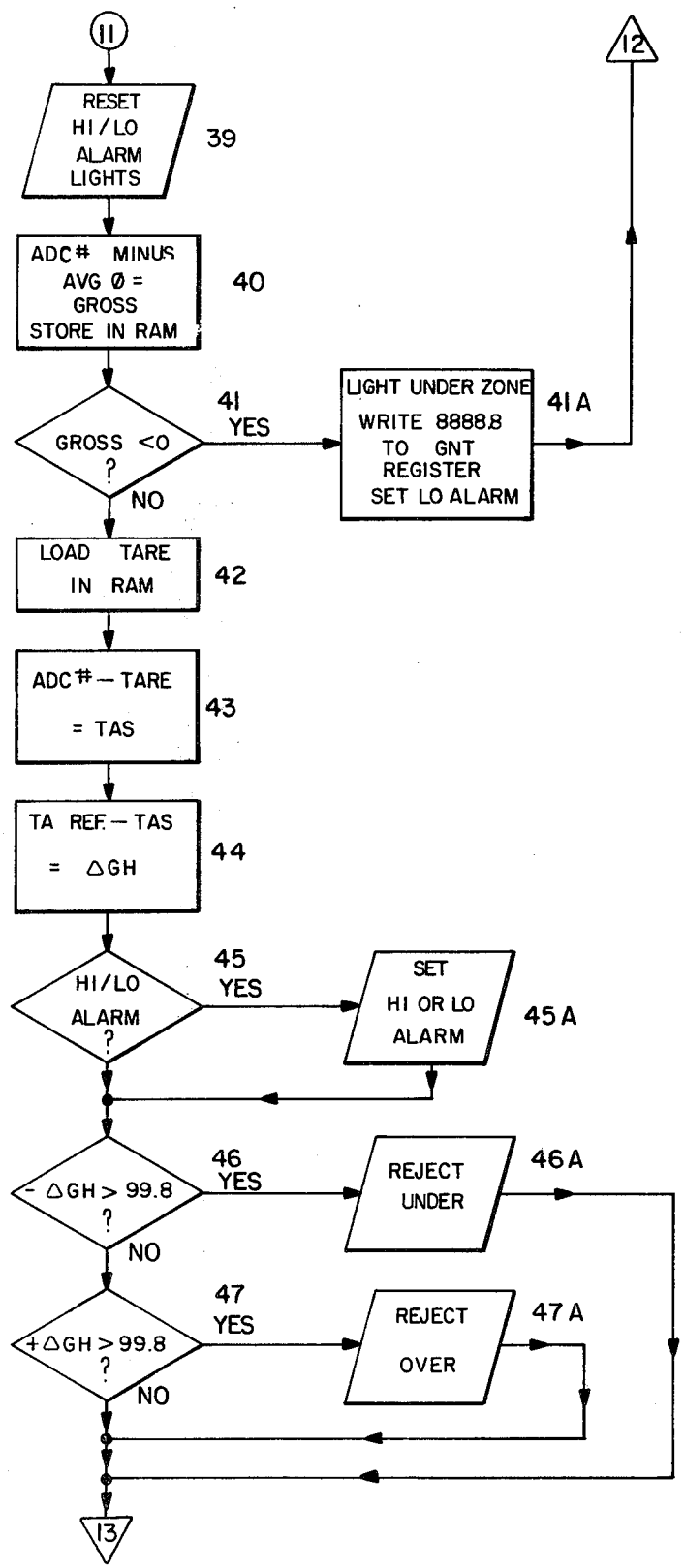
FIG.—5E

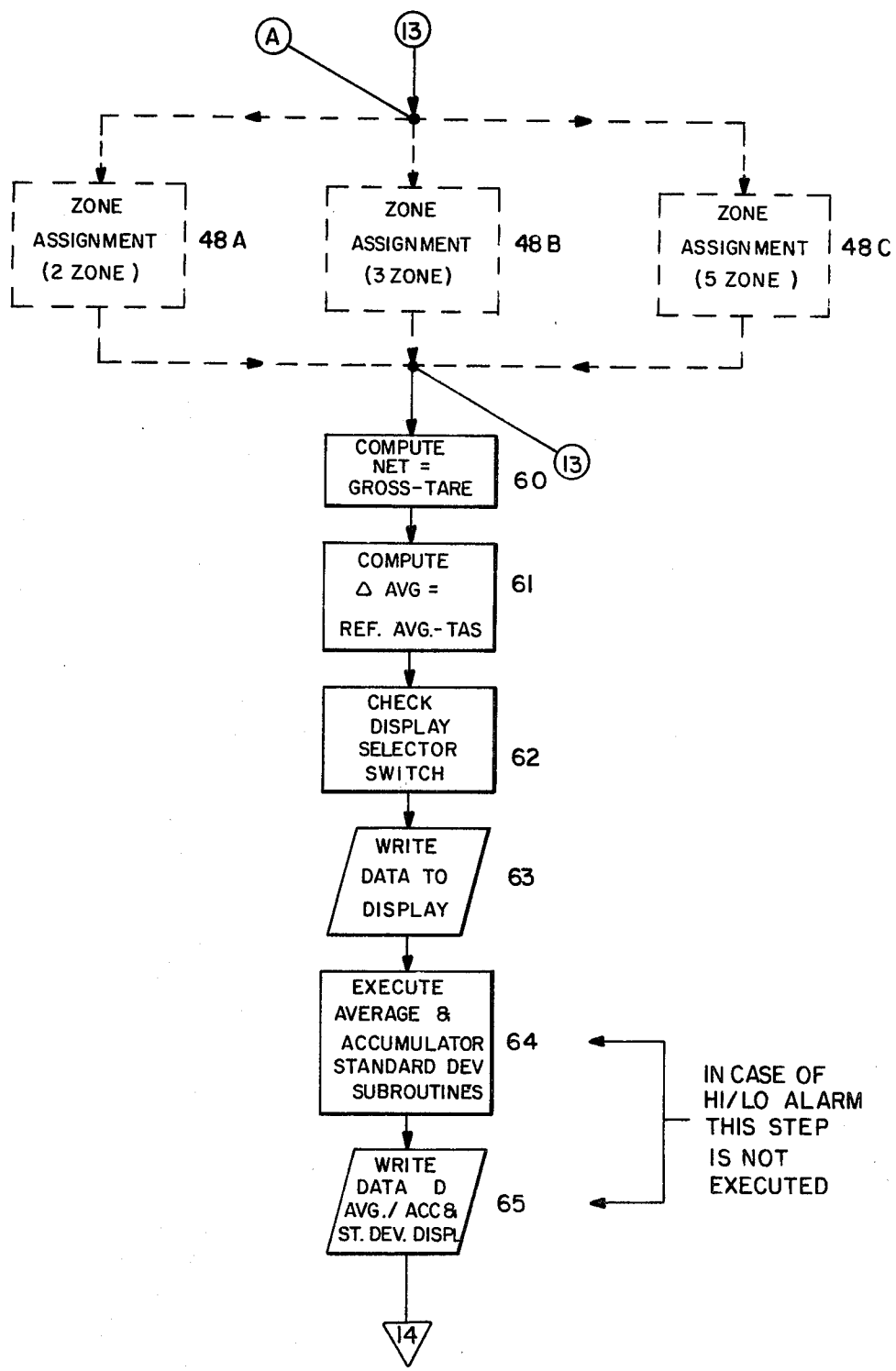
FIG.—5F

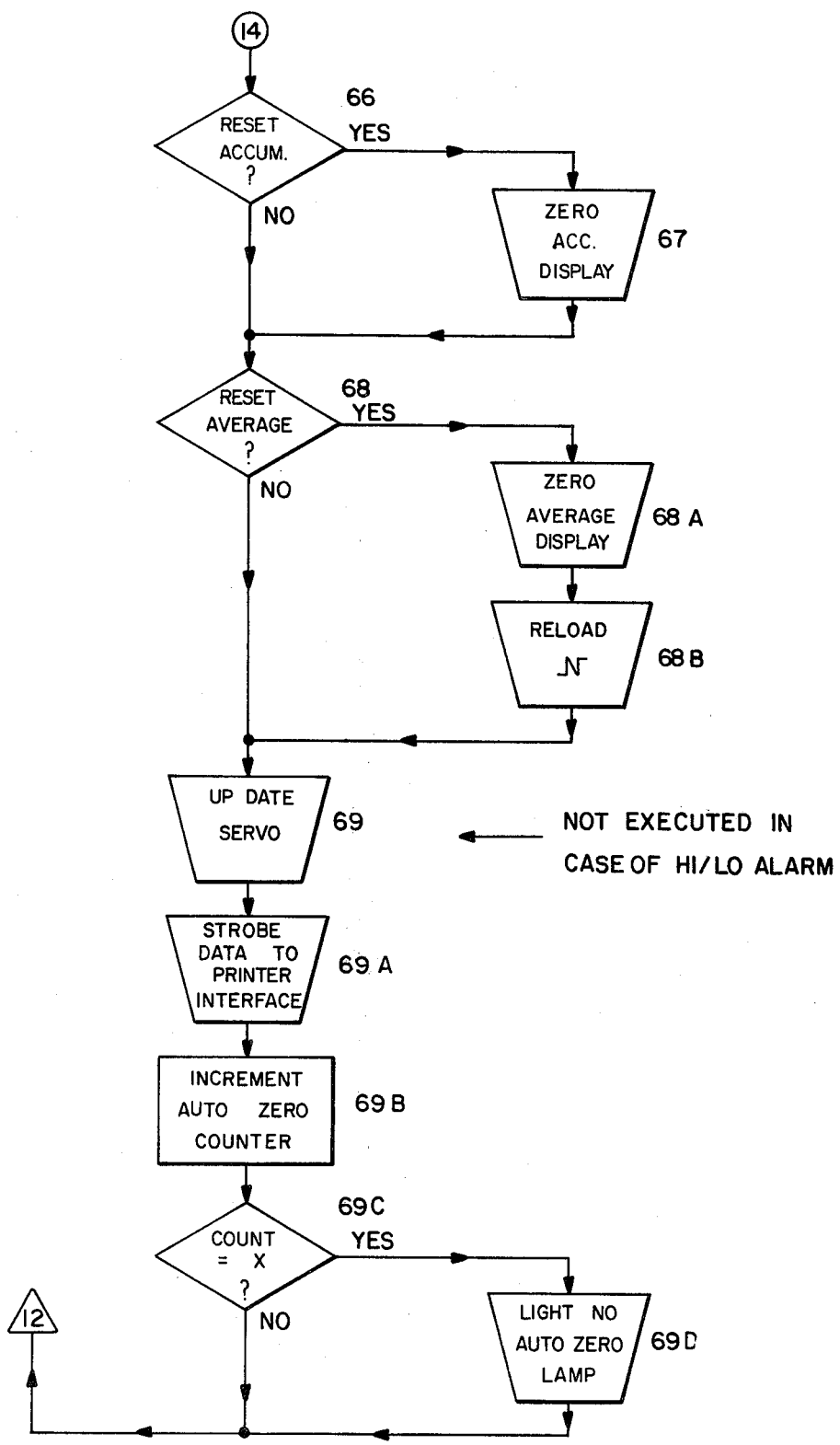
FIG.—5G

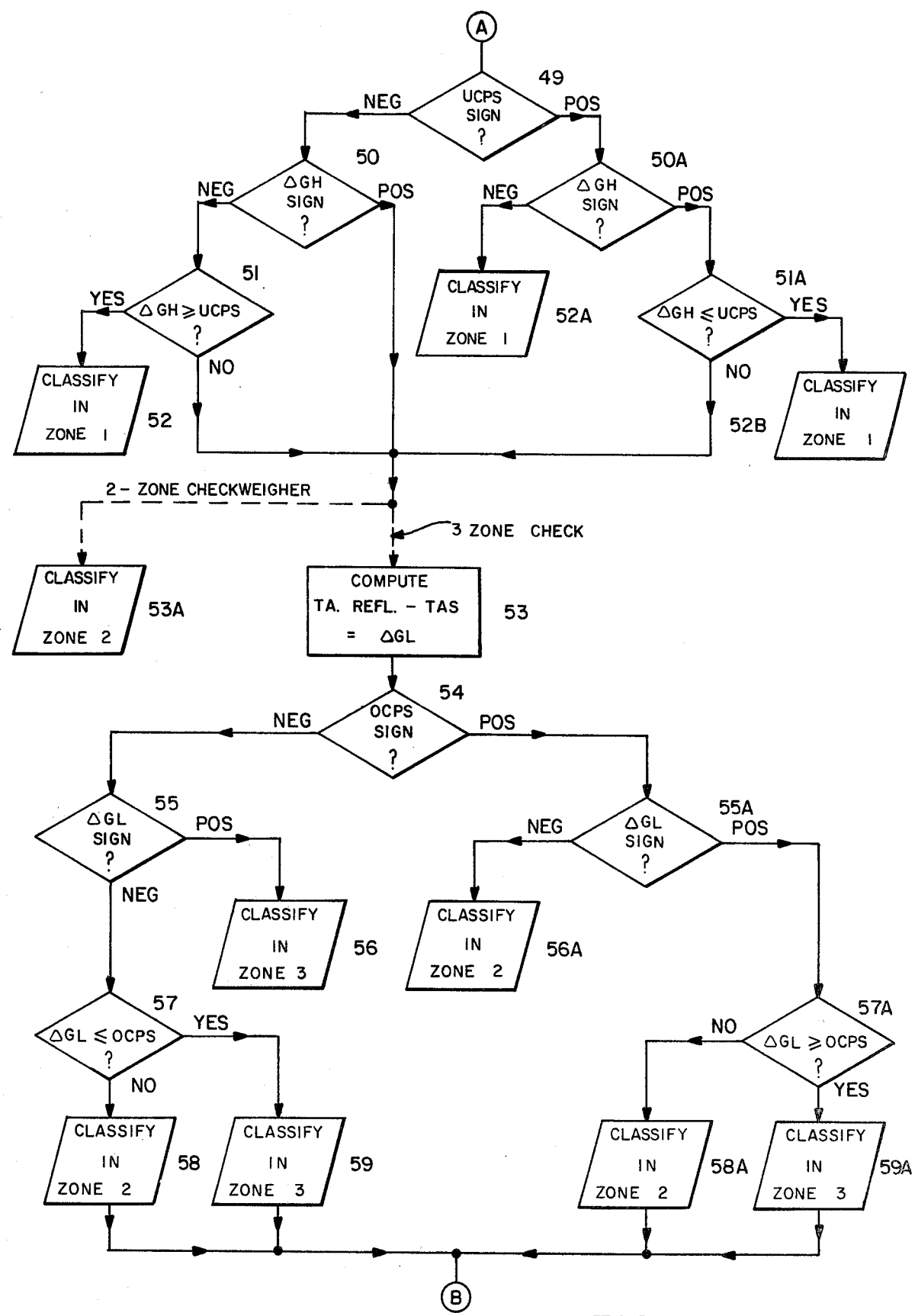
FIG.—5H

DIGITAL WEIGHING METHOD

BACKGROUND OF THE INVENTION

The present invention is directed to a digital weighing method.

In prior check weighing methods the initial set up technique was slow and cumbersome. And even after such set-up which included initial zeroing and passing a reference weight over a weight table, there was no certainty of continued accuracy. This was especially true if no skilled operator was present.

Also with the advent of greater automatic and computerized packaging control capabilities, prior weighing methods provided insufficient information and in the wrong format.

OBJECTS AND SUMMARY OF THE INVENTION

It is, therefore, a general object of the present invention to provide an improved weighing method which remedies the deficiencies of past techniques.

Accordingly there is provided a weighing method where a weighing cell is responsive to items passing over an associated weight table and produces a digital count related to the weight of an item on the weight table. Initially while no item is on the weight table average zero count is determined. Thereafter a digital count corresponding to a reference weight is stored. Items are run over the weight table and a digital count for each item is sensed taking into account the average zero count. The digital count is compared to the reference. While no item is on the weight table a new average zero count is again determined as in the first step.

BRIEF DESCRIPTION OF THE DRAWINGS

FIG. 1 is a block diagram of apparatus which performs the method of the present invention;

FIG. 2 is a simplified elevational view of a portion of FIG. 1;

FIG. 3 shows the control panel for the apparatus of FIGS. 1 and 2;

FIG. 4 is a diagram useful in understanding the invention;

FIG. 4A is an additional diagram; and

FIGS. 5A through 5H are eight flow charts showing the method of the invention.

DETAILED DESCRIPTION OF THE PREFERRED EMBODIMENT

Referring to FIG. 1 a strain gauge load cell 70 includes four strain gauges R1, R2, R3 and R4 arranged in a Wheatstone bridge configuration. The output after being amplified and filtered by the units 71 and 72 is converted into digital format by analog to digital converter 73. The magnitude of the digital count is indicative of or related to the absolute weight of the item placed on the load cell. This digital count is connected to a microprocessor 74 or other type of computer through input ports 76. Other inputs are from various control units which will be described below. Output ports 77 provide for readout to both written and visual displays, alarms and servo controls.

Microprocessor 74 is under the control of a PROM (programmable read only memory) 78 and has associated with it a data RAM (random access memory) 79.

The structural details of the strain gauge load cell 70 are illustrated in FIG. 2 which is an elevational view of a figure eight frame configuration 90. The upper portion of the beam includes the four strain gauges R1 through R4 and is attached to a weight table 91 with item 92 which is being weighed resting on it. Frame 90 is deflected by the weight of an item, a gap 93 tending to close. This deformation is sensed by the associated Wheatstone bridge R1-R4. In actual practice weight table 91 would be a portion of a conveyor system by which items 92 are passed at a rate of, for example, twenty thousand per hour. Because of severe ambient conditions the load cell 70 should be water proof. The actual load cell 70 is available from several manufacturers including Sensor Tronics of Covina, Calif. and Transducers Incorporated of Los Angeles, Calif.

FIG. 3 shows the control panel which includes several displays and controlled inputs in the form of indicator lights, numeric L.E.D. displays, pushbuttons and thumbwheel switches most of which will be discussed below in conjunction with the associated flow charts of FIGS. 5A through 5H.

FIG. 4 is a simplified diagram illustrating the different weights sensed by the load cell from light to heavy as indicated. Level 81 shows a theoretically zero weight but because of the weight table weight and extraneous material which might have collected on the load cell weight table and imperfections in the bridge circuit, the average zero level 82 is computed. The actual digital count (ADC#) from converter 73 is shown as level 83. Gross weight is the difference between levels 83 and 82. The remainder of the diagram will become clear from the following description.

Referring now to FIGS. 5A through 5H, the functional blocks or program steps of the flow chart are numbered from one through 69. The letters indicate path connections.

Start of operation, step 1, is initiated by a control switch on the control panel of FIG. 3. In steps 2 and 3 all of the output ports are reset including the average, accumulator and standard deviation displays. In other words, everything is cleared on the control panel. Next (step 4) all eights are loaded in the light emitting diode displays to test the operation of all segments.

In order to reject erroneous readings during the zeroing and referencing of the system, step 5 shows the loading of data RAM 79 (FIG. 1) with 2.9 and 9.9 grams. Specifically, if during the zeroing procedure any pair of successive readings or the first and last reading of the ten readings differ by more than 2.9 grams, all of the ten readings will be rejected. Similarly, when a reference weight is passed over the load weight table twenty successive time a difference of more than 9.9 grams is rejected. For example, one cause of an erroneous reading might be the accidental bumping of the weight table or the manual breaking of the manual photo-interlock. This is in essence a parity check.

In general the philosophy of all of the controls of the control panel (FIG. 3) is that whatever light blinks it should be pushed. Thus step 6 initiates a blinking zero light shown on the control panel of FIG. 3 as 6' and when the operator pushes the light button it turns to a solid illuminated state. Ten successive readings of analog to digital converter numbers or counts (ADC#) are taken with no item on the weight table conveyor (step 8). Pairs of readings are compared for the 2.9 gram maximum difference and as illustrated in step 9 if they are "OK", the average is stored in RAM 79 (step 10).

All zeros are placed in the GTN (Gross, Tare, Net) display 11' (block 11) to indicate to the operator that he may start the referencing portion in the operation. This is also indicated in step 12 by blinking the pass reference weight light 12'. If the light is blinking, the operator must push it (step 13) to initiate the referencing procedure and the light goes on solid (step 14). At the same time the zero light turns off. In step 15 a reference weight must be passed over the weight table 20 times by an operator and as discussed above pairs of readings are checked in step 15B to determine if any pair should be rejected because of a difference greater than 9.9 grams. In many industries the use of a reference weight and especially its passage over the weight table 20 times is recommended and generally accepted by the Scale Mfgs. Assoc. However, only a single pass may be suitable in some circumstances and step 15 can be so modified. Step 15 can be aborted by pushing the zero button (15A) to return to step 4. This might be done if the operator chose the wrong package for referencing. If all reference readings are "OK", run light 19' (FIG. 3) will blink. In addition as indicated in step 16 there will be loaded in RAM 79 the digital counts representing the lightest, the heaviest and the average of all of the 20 accepted readings of reference weight. These three weights are illustrated in FIG. 4. By way of explanation the difference between reference light and reference heavy is known in the weighing art as the indeterminate or grey zone of the weight system. Therefore, to insure that no item which is subsequently weighed will be underweight, such item must effectively have a weight greater than the reference heavy weight. Similarly to accurately check for overweight items these should be compared against reference light. Finally reference average is used for weighing applications where the grey zone is not used and the product weight is compared with this average and as such classified in one of several weight zones. In addition it is used to compute standard deviation and "give away" weight which will be explained below.

As illustrated in step 16 if a reference step is not desired, a set of thumb wheel switches can be used (not shown however on the control panel) to load a reference weight in externally. This might occur where less accuracy is necessary.

In step 17 the sequence of the cutpoint switches which consist of the top or underweight cutpoint thumbwheel switch (UCPS) 17' and the bottom or overweight cutpoint thumbwheel switch (OCPS) 17" must be checked in the upper left hand portion of the control panel of FIG. 3. The top thumbwheel switch represents an algebraically lower number than the bottom switch. The numbers indicate the plus or minus difference in grams from the reference weight. The top thumbwheel switch 17' determines the underweight (red) zone or difference from the reference heavy weight. The bottom switch 17" determines the overweight (amber) zone or difference from the reference light weight. The zone between the top and bottom thumbwheel switches is the accept (green) zone. Thus, the thumbwheel switches go from light to heavy from top to bottom. Because of this the proper cutpoint switch sequence demands that the lower thumb wheel switch must be an algebraically greater number than the upper row. Thus the thumbwheel cutpoint switches are used to set the underweight and overweight reject zones. For example, as illustrated in FIG. 4A to set the apparatus to reject any package that is 20 grams lighter than the reference weight, a −020.0 is set in thumbwheel 17'. Any package that differs from the reference weight (actually reference heavy) by 20 or more grams lighter will be rejected as under reject and light the red underweight light. For overweight packages to set the machine to reject any package that is 50 grams or more heavier than the reference weight (actually the reference light weight) lower thumbwheel switch 17' would have set therein +050.0. Thus in the foregoing example the accept or green zone indicated by the green light at the top of the control panel would have a range assuming a reference average of 100 grams and the illustrated grey zone of 1.8 grams of 80.8 to 149 grams. Check weighing conveyor systems normally are set up so that rejected items can be physically diverted.

It is now obvious that if it is desired to reject any package which is less than the reference weight which is being used the top cutpoint switch 17' would be set at 000.0. An advantage of the invention is if an item having a weight different from the reference weight is desired to be weighed the cutpoint switches can be easily adjusted. This is especially useful where during a production run it is desired to immediately change from one size package to another.

In step 18 if the cutpoint sequence is not proper, the wrong sequence light 17A' is blinked and the cutpoint switches must be readjusted. Assuming the sequence is acceptable run light 19' is blinked in step 19. The run push button is pushed (step 20) and in step 21 the tare reference is loaded in the RAM.

Tare is, of course, the weight of the container or package of the item being weighed. It is in essence the empty package weight. The tare reference can be generated in two ways. This is illustrated by the tare switch 21" which has an internal external alternative and a tare thumbwheel 21' set at the required tare weight. The external tare is generated by peripheral equipment. One external source of tare might be a weighing device similar to that of the present invention which would be weighing the unfilled or empty packages and would have its digital count output synchronized with that of the item weigher. In step 22 the tare reference is subtracted from the reference average, heavy and light computed in the step 16 and stored in the RAM for later access. The diagram of FIG. 4 illustrates these three weights.

In step 23 the run light 19' turns on solid indicating to the operator that the apparatus is ready to run a production line. At that point the in-feed conveyors are turned on and the item or product is passed over the weight table at a relatively high rate. Step 24 indicates that the analog to digital converter is actually producing an output if its status is high. This is a priority indication since all other manipulations and calculations must be aborted to allow the digital number representing the weight of an item to be stored in RAM as indicated in step 24A. Step 24A continues to step 39. However, assuming that no item is yet on the weight table the sequence of the cutpoint switches is again checked in steps 25 and 26. This is thus a continuous check to insure that the cutpoint switches have not been erroneously adjusted. If the wrong sequence is present, then the point A indicates a return to step 17A. In step 27 a check is made of whether the pass reference weight button 12' has been pushed which might occur if the operator has decided to re-reference the apparatus for a new product. Lastly, in step 28 if the operator decides to rezero the apparatus because of, for example, product build-up on the weight table zeroing occurs in steps 33 and 34 similar to the steps 8 and 9. While this rezeroing step is occuring, if an item or product is passed over the weight table all readings are not OK in tep 34 routing the program to step 34A where the high status of the analog to digital converter 73 causes the ADC# to be loaded in RAM in step 24A. This step 34A is similar to step 24 and performs a priority function to insure that every item is weighed.

Referring back to step 28 if the zero button has not been pushed, the microprocessor in step 29 checks the average and accumulator reset switches 29' and 29" which are on the control panel (FIG. 3) and if actuated, the associated display will be reset to zero. In step 30 the display selector switch 30' is checked and selected data displayed. There are four possibilities for the selector switch 30' which consist of tare weight, net weight, gross weight and deviation from the reference weight. This is designated GTN display 11'.

In step 31 a zero timer is incremented by one which occurs each time the sequence of operation passes through step 31 and if timed out (step 32) will initiate a automatically rezeroing in step 33. Thus, steps 24 through 31 are a type of standby procedure. And more importantly these steps ensure that zeroing will again take while a weighing gap occurs. The zero timer is usually set to rezero every six to seven seconds. In step 35 a new zero reading is compared with the old zero information and if different, it is updated in steps 36 and 37. In other words, the reference light, reference heavy and reference average are all updated. In step 38 the zero timer is reset and in step 38A the "no auto zero" is reset. The main purpose of the no auto zero lamp indication is to indicate to the operator that after a predetermined number of items have passed over the weight table there has not been a sufficient gap in the product line to allow an automatic zeroing to take place and thus at this point the operator may wish to create a gap. The zero timer in this mode is effectively controlled. This is shown in steps 69A through 69D where data of the weight of an item may be printed at 69A and the autozero counter is incremented in step 69B. If the count is equal to a predetermined number the no autozero lamp 69D' is illuminated.

If an item is being passed over the weight table, then the digital count sensed in step 24A is handled in the following manner. Path C departing from step 24A goes to step 39 where the high/low (HI/LO) alarm lights 39' and 39", shown on the control panel, are reset. These indicate to the operator if a severely out of weight item is passed over the weight table. In step 40 the average zero which has previously been stored is subtracted from the ADC# (digital count) and the resultant gross weight, indicated by the difference 84 in FIG. 4, is stored in the RAM. In step 41 a check is made whether this gross is less than zero or greater than zero. If less than zero, the low alarm is set in step 41A and the red underweight zone light is illuminated on the top of the control panel. In addition, all eights are written in the GTN display 11'. The E path is escaped to which is step 24 to await the next item to be weighed. Thus, the comparison of step 41 indicates to the operator that a significantly underweight item was detected and that the data for the particular package or item should be rejected and perhaps further investigation made of the packaging process.

However, if the gross weight is not less than zero, then it may be valid information and in step 42 the tare from the thumbwheel switches 21' or from an external source is loaded into the RAM. In step 43 the tare is subtracted from the digital count (ADC#) to produce the TAS (tare adjusted sample) weight. Next in step 44 the tare adjusted reference heavy (TA.REFH) (see step 22) is subtracted from TAS to produce $\Delta$GH. This is illustrated in FIG. 4 also.

The HI/LO alarm levels are set by associated thumbwheel switches (FIG. 3) and are for the purpose of indicating significant departures from the expected weights. Also steps 64, 65 and 69 are not executed. The HI/LO alarms are especially useful in rejecting double or empty packages and preventing the entry of this erroneous data. Thus in step 45A the $\Delta$GH is compared with the differences set in the low alarm and high alarm thumbwheel switches. In step 46 a comparison is made with 99.8 which is the capability of the apparatus which is the largest number that can be placed in the cut point switch of a, for example, 2 kilogram machine. The positive direction is checked in step 47 and if either of these are out of range the underweight or overweight lights are illuminated in steps 46A and 47A and the item is physically rejected.

Assuming however the steps 45, 46 and 47 produce no indications, then at point F the digital count which is indicative of the weight of the item may be assigned to several zones. In the preferred embodiment this would be an overweight, underweight or accept zone. In other words, a three zone system as in step 48B. A five zone system is possible although not shown in step 48C or a more simplified two zone system in step 48A. Following the F path, in step 49 the under cutpoint switch (UCPS) sign is negative and if the $\Delta$GH sign is checked. If this is negative, in step 50 this is compared to the undercut point amount set in the top cut point switch 17'. If greater as indicated in step 52, the product is rejected as underweight; i.e., classified in underweight zone 1. Since reference heavy weight is used in this procedure an almost 100% indication of underweight is assured.

In step 51 if $\Delta$GH is equal or greater than UCPS, step 53 is proceeded to where overweight is determined; that is, the difference between the tare adjusted sample and the tare adjusted reference light weight as shown in the diagram of FIG. 4. See also FIG. 4A. If the check weigher, however, is only a two zone machine then step 53A is immediately executed since obviously if the product did not classify in zone one it must be zone two. In other words, here the customer is concerned only with underweight packages.

Assuming, however, a three zone check weigher then step 53 is executed where TA. REFL. is tare adjusted reference light. In steps 54 and 55 the signs are checked. And in step 55 if the $\Delta$GL sign is positive, then the item is automatically overweight and classified zone three in step 56. If negative, in step 57 GL is compared with the over cutpoint switch setting 17" and if less, the item is classified in zone two as accepted; if greater in step 59 it is classified ine zone 3 as overweight. The remaining positive sides of steps 49 and 54 are obvious from inspection. Thus the cutpoint switches effectively provide boundaries for classification purposes.

Path G returns to step 60 where the net weight is computed as the difference between gross and tare. In step 61 the difference between the deviation from the reference average and the actual weight is checked. In steps 62, 63 the foregoing is displayed if switch 30' is rotated to "NET" or "DEV".

In step 64 the average, accumulator and standard deviation subroutines (not shown) are executed. Information is read into the displays shown in FIG. 3 in step 65. More specifically in the averaging step the actual weight of the product is averaged over a predetermined number of samples, N, which is set on the thumbwhell switches. The associated switch is set at "weight". Alternatively the "DEV" setting the average of deviation from the reference weight can be displayed.

In the accumulation mode of step 64 the total "give away" weight is displayed where the differences in the overweight direction is accumulated; that is, only those product weight deviations greater than the reference weight. Alternatively the "total" product weight over a time period can be accumulated.

The standard deviation routine displays the weight distribution of the product. Path D to steps 66 through 69 provides housekeeping where displays are reset. After an item has been measured, in step 69B the auto zero counter is incremented and path E is taken. This is at the beginning of step 24 where the microprocessor is ready to process another item.

In conclusion the present invention has for the first time provided an all digital checkweigher. In the flow charts which show the functioning of microprocessor 74 all its associated RAM all weight data is necessarily in the form of digital counts. This in combination with a full scale strain gauge load cell yields a checkweigher of low cost, high accuracy and great versatility as illustrated by the ease of set-up and the many options available.

What is claimed is:

1. A weighing method where a weighing cell is responsive to moving items passing over an associated weight table and produces a digital count related to the weight of an item on the weight table comprising the following steps: initially while no item is on the weight table determining an average zero count; thereafter storing a digital count corresponding to a reference weight; running said items over said weight table, sensing said digital count for each item and, taking into account said average zero count, comparing such digital count to said reference weight count; and while no item is on the weight table again determining a new average zero count as in the first step.

2. A method as in claim 1 where said average zero count is determined by sensing in successive intervals of time a predetermined plurality of digital counts and averaging said counts to provide said average zero count.

3. A method as in claim 1 where in said step of storing a digital count corresponding to a reference weight a reference weight is passed over said weight table a predetermined plurality of times and the resultant digital count for each pass sensed to provide a grey zone.

4. A method as in claim 1 where said reference weight is stored by positioning thumbwheel switches.

5. A method as in claim 1 where said weighing cell digital count ranges from substantially zero with no item on said table to a full scale count with an item of maximum capacity on said table.

6. A method as in claim 1 including the step of indicating that no new average zero count has been determined after a predetermined number of items has passed over said weight table.

7. A weighing apparatus comprising: a weighing cell responsive to moving items passing over an associated weight table to produce a digital count related to the weight of an item on the weight table such count ranging from substantially zero with no item on said table to a full scale count with an item of maximum capacity on said table; means for classifying items into at least two classes including means for storing in digital form a number related to a desired boundary for classifying said items and for comparing said stored number with said digital weight count such boundary number being related to a reference weight passed over said weight table.

8. Apparatus as in claim 7 where said boundary is a cutpoint.

9. Apparatus as in claim 8 where said boundary number is digitally entered by thumbwheel switches.

10. A weighing method where a load cell is responsive to items passing over an associated weight table and produces a digital count related to the weight of an item on the weight table comprising the following steps: initially while no item is on the weight table sensing in successive intervals of time a predetermined plurality of digital counts and averaging said counts to provide an average zero count; thereafter passing a reference weight over said weight table at least once, sensing the resultant digital count for each pass, and storing at least the digital count corresponding to the heaviest pass; running said items over said weight table, sensing said digital count for each item and, taking into account said average zero count, comparing such digital count to said heaviest pass count of said reference weight; and while no item is on the weight table again determining a new average zero count in accordance with the first step.

11. A method as in claim 10 where said reference weight count may also be stored by positioning thumbwheel switches.

12. A method as in claim 10 including the step of rejecting an item having a digital count less than said heaviest pass digital count.

13. A method as in claim 10 including the steps of modifying said heaviest pass count by an amount equal to the difference between said reference weight and the nominal weight of said item to be weighed.

14. A method as in claim 10 including the step of indicating that no new average zero count has been determined after a predetermined number of items has passed over said weight table.

15. A method as in claim 10 where said step of again determining said new average zero count is interrupted if an item is sensed on said weight table.

16. A method as in claim 10 where in said running step the tare of said item is taken into account.

17. A method as in claim 10 where in said average zero steps each of said plurality of digital counts is compared with a predetermined maximum difference to eliminate invalid counts.

18. A method as in claim 10 where in said step of passing said reference weight over said weight table said resultant digital count is compared with a predetermined maximum difference to eliminate invalid counts.

19. A method as in claim 10 together with the step of establishing high and low weight levels and comparing such levels to said digital counts for each item to eliminate items significantly different from the expected weight of said item.

20. A method as in claim 10 where in said step of passing said reference weight over said weight table the digital count corresponding to the lightest pass is stored and in said running step said digital count for each item is also compared to said lightest pass count.

21. A method as in claim 20 including the steps of modifying said lightest pass count by an amount equal to the difference between said reference weight and the nominal weight of said item to be weighed.

22. A method as in claim 10 including the step of establishing a pair of cutpoints for said reference weight.

23. A method as in claim 22 together with the step of actuating an alarm if a predetermined one cutpoint is not algebraically less than the other cutpoint.

24. A weighing method where a load cell is responsive to items passing over an associated weight table and produces a digital count related to the weight of an item on the weight table comprising the following steps: initially while no item is on the weight table sensing in successive intervals of time a predetermined plurality of digital counts and averaging said counts to provide an average zero count; thereafter passing a reference weight over said weight table at least once, sensing the resultant digital count for each pass, and storing at least the digital count corresponding to the lightest pass; running said items over said weight table, sensing said digital count for each item and, taking into account said average zero count, comparing such digital count to said lightest pass count of said reference weight; and while no item is on the weight table again determining a new average zero count in accordance with the first step.

25. A method as in claim 24 where said reference weight count may also be stored by positioning thumbwheel switches.

26. A method as in claim 24 including the step of indicating that no new average zero count has been determined after a predetermined number of items has passed over said weight table.

* * * * *